(12) United States Patent
Zises (10) Patent No.: US 11,019,133 B2
(45) Date of Patent: *May 25, 2021

(54) SYSTEM AND METHOD FOR TRANSFERRING STATES BETWEEN ELECTRONIC DEVICES

(71) Applicant: eBay Inc., San Jose, CA (US)

(72) Inventor: Matthew Scott Zises, San Jose, CA (US)

(73) Assignee: eBay Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/909,612

(22) Filed: Jun. 23, 2020

(65) Prior Publication Data

US 2020/0322419 A1 Oct. 8, 2020

Related U.S. Application Data

(63) Continuation of application No. 16/247,851, filed on Jan. 15, 2019, which is a continuation of application
(Continued)

(51) Int. Cl.
*G06F 21/55* (2013.01)
*H04L 29/08* (2006.01)
*G06F 21/32* (2013.01)

(52) U.S. Cl.
CPC .............. *H04L 67/06* (2013.01); *G06F 21/32* (2013.01); *H04L 67/025* (2013.01); *H04L 67/10* (2013.01);
(Continued)

(58) Field of Classification Search
CPC .................................................. G06F 21/552
See application file for complete search history.

(56) References Cited

U.S. PATENT DOCUMENTS 6,636,888 B1 10/2003 Bookspan et al.
7,035,957 B2 4/2006 Ishiwata
(Continued)

FOREIGN PATENT DOCUMENTS

CN 1945535 A 4/2007
CN 101675639 A 3/2010
(Continued)

OTHER PUBLICATIONS

Notice of Allowance received for Korean Patent Application No. 10-2018-7027228, dated Mar. 28, 2019, 3 pages (2 pages of Official Copy and 1 Page of English Translation).
(Continued)

*Primary Examiner* — William S Powers
(74) *Attorney, Agent, or Firm* — Holland & Hart LLP (57) ABSTRACT

In some examples, a system comprises a memory device for storing instructions and a processor which executes instructions causing the system to perform operations comprising receiving an instruction to transfer a state of a first device to a second device, and packaging information relating to the state of the first device in a file. The packaging of the information relating to the state of the first device includes recording each application executing on the first device in a list maintained in the file, and transferring the file containing information relating to the state of the first device to the second device, either directly or indirectly based on an availability of connections between the first device and the second device. The file, when processed by the second device, causes the second device to reproduce the state of the first device. In some example, reproducing the state of the first device includes the second device downloading, from one or more of the locations, one or more of the applications.

20 Claims, 5 Drawing Sheets

Related U.S. Application Data

No. 15/472,942, filed on Mar. 29, 2017, now Pat. No. 10,200,451, which is a continuation of application No. 15/002,583, filed on Jan. 21, 2016, now Pat. No. 9,621,631, which is a continuation of application No. 14/462,398, filed on Aug. 18, 2014, now Pat. No. 9,246,984, which is a continuation of application No. 13/340,046, filed on Dec. 29, 2011, now Pat. No. 8,819,798.

(52) U.S. Cl.
CPC ...... *H04L 67/36* (2013.01); *G06F 2221/2111* (2013.01)

(56) References Cited

U.S. PATENT DOCUMENTS

| | | | |
|---|---|---|---|
| 8,171,137 | B1 | 5/2012 | Parks et al. |
| 8,494,439 | B2 | 7/2013 | Faenger |
| 8,819,798 | B2 | 8/2014 | Zises |
| 9,137,258 | B2* | 9/2015 | Haugsnes ......... G06F 16/24575 |
| 9,246,984 | B2 | 1/2016 | Zises |
| 9,621,631 | B2 | 4/2017 | Zises |
| 9,864,628 | B2 | 1/2018 | Wormald |
| 10,200,451 | B2 | 2/2019 | Zises |
| 10,749,932 | B2 | 8/2020 | Zises |
| 2003/0195963 | A1 | 10/2003 | Song et al. |
| 2003/0208541 | A1 | 11/2003 | Musa |
| 2004/0049673 | A1 | 3/2004 | Song et al. |
| 2004/0139268 | A1 | 7/2004 | Ishiwata |
| 2005/0229036 | A1 | 10/2005 | Milstein et al. |
| 2005/0289382 | A1 | 12/2005 | Lee |
| 2006/0105713 | A1 | 5/2006 | Zheng et al. |
| 2006/0120518 | A1 | 6/2006 | Baudino et al. |
| 2006/0230265 | A1 | 10/2006 | Krishna |
| 2007/0136279 | A1 | 6/2007 | Zhou et al. |
| 2008/0120350 | A1 | 5/2008 | Grabowski et al. |
| 2008/0160974 | A1 | 7/2008 | Vartiainen et al. |
| 2009/0063690 | A1 | 3/2009 | Verthein et al. |
| 2009/0075697 | A1 | 3/2009 | Wilson et al. |
| 2009/0089561 | A1 | 4/2009 | Tomko et al. |
| 2009/0190607 | A1 | 7/2009 | Pozhenko et al. |
| 2009/0204966 | A1 | 8/2009 | Johnson et al. |
| 2009/0204996 | A1 | 8/2009 | Kim et al. |
| 2009/0247195 | A1 | 10/2009 | Palmer et al. |
| 2009/0257416 | A1 | 10/2009 | Walker et al. |
| 2009/0276547 | A1* | 11/2009 | Rosenblatt ........... B01D 53/944 710/33 |
| 2009/0300138 | A1 | 12/2009 | Schneider |
| 2010/0257251 | A1* | 10/2010 | Mooring ................. H04W 4/21 709/216 |
| 2011/0264992 | A1 | 10/2011 | Vishria et al. |
| 2013/0004689 | A1 | 1/2013 | Di Bono et al. |
| 2013/0036231 | A1 | 2/2013 | Suumaki |
| 2013/0046893 | A1 | 2/2013 | Hauser et al. |
| 2013/0073676 | A1 | 3/2013 | Cockcroft |
| 2013/0174237 | A1 | 7/2013 | Zises |
| 2014/0006465 | A1 | 1/2014 | Davis et al. |
| 2014/0172495 | A1* | 6/2014 | Schneck ............ G06Q 10/0635 705/7.28 |
| 2014/0359067 | A1 | 12/2014 | Zises |
| 2016/0142469 | A1 | 5/2016 | Zises |
| 2017/0201567 | A1 | 7/2017 | Zises |
| 2019/0149595 | A1 | 5/2019 | Zises |

FOREIGN PATENT DOCUMENTS

| | | |
|---|---|---|
| CN | 104169899 A | 11/2014 |
| CN | 104169899 B | 11/2014 |
| CN | 107105001 A | 8/2017 |
| EP | 1760584 A1 | 3/2007 |
| JP | 2011523245 A | 8/2011 |
| KR | 1020050043721 A1 | 5/2005 |
| KR | 1020100049482 A | 5/2010 |
| KR | 101775859 B1 | 9/2017 |
| WO | 2013/097898 A1 | 7/2013 |
| WO | 2013/101950 A1 | 7/2013 |

OTHER PUBLICATIONS

Corrected Notice of Allowability received for U.S. Appl. No. 16/247,851, dated Jul. 21, 2020, 3 pages.
Non-Final Office Action received for U.S. Appl. No. 16/247,851, dated Dec. 12, 2019, 8 pages.
Notice of Allowance received for U.S. Appl. No. 16/247,851, dated Feb. 21, 2020, 8 pages.
Notice of Allowance received for U.S. Appl. No. 16/247,851, dated Mar. 25, 2020, 8 pages.
Response to Ex-Parte Quayle Action filed on Feb. 12, 2020, for U.S. Appl. No. 16/247,851, dated Dec. 12, 2019, 8 pages.
Response to Office Action filed on Aug. 4, 2020, for Canadian Patent Application No. 2,856,882, dated Apr. 6, 2020, 15 Pages.
Response to Office Action filed on Sep. 17, 2019 for Canadian Patent U.S. Appl. No. 15/642,980, dated Mar. 28, 2019, 18 pages.
Notice of Allowance received for Australian Patent Application No. 2012362419, dated Sep. 14, 2015, 2 pages.
Notice of Decision to Grant received for Korean Patent Application No. 2014-7021217, dated May 30, 2016, 2 pages (1 Page of English Translation and 1 Page of Original Copy).
Notice of Acceptance received for Australian Patent Application No. 2015275329, dated Jan. 4, 2017, 3 pages.
Notice of Decision to Grant received for Korean Patent Application No. 2016-7023618, dated May 31, 2017, 2 pages (1 Page of English Translation and 1 Page of Original Copy).
Office Action received for Korean Patent Application No. 10-2016-7023618, dated Nov. 25, 2016, 9 pages (with English Claims).
Response to Office Action filed on Feb. 27, 2017 for Korean Patent Application No. 10-2016-7023618, dated Nov. 25, 2016, 21 pages (with English Claims).
Notice of Allowance received for Korean Patent Application No. 10-2017-7024301, dated Jun. 19, 2018, 3 pages (1 page of English Translation and 2 pages of Official Copy).
Office Action received for Korean Patent Application No. 2017-7024301, dated Nov. 30, 2017, 4 pages (Official copy only).
Response to Korean Office Action dated Jan. 31, 2018 for Korean Patent Application No. 10-2017-7024301, dated Nov. 30, 2017, 21 pages (Including English Claims).
Response to Office Action filed on Nov. 27, 2017 for Canadian Patent Application No. 2,856,882, dated Sep. 28, 2017, 17 pages.
Office Action received for Korean Patent Application No. 10-2018-7027228, dated Oct. 30, 2018, 8 pages (4 pages of English Translation and 4 pages of Official copy).
Response to Office Action filed on Dec. 21, 2018, for Korean Patent Application No. 10-2018-7027228 , dated Oct. 30, 2018, 9 pages (3 pages of English Translation and 6 pages of Official Copy).
Communication Pursuant to Article 94(3) EPC received for European Patent Application No. 12862729.6, dated Aug. 7, 2019, 6 pages.
Extended European Search Report received for European Patent Application No. 12862729.6, dated Oct. 13, 2016, 8 pages.
Response to Communication Pursuant to Article 94(3) filed on Dec. 20, 2019 , for European Patent Application No. 12862729.6, dated Aug. 7, 2019, 15 pages.
Response to European Search Report Filed on May 3, 2017 for European Patent Application No. 12862729.6 dated Oct. 13, 2016, 15 pages.
Final Office Action received for U.S. Appl. No. 13/340,046, dated Nov. 20, 2013, 20 pages.
Non-Final Office Action received for U.S. Appl. No. 13/340,046, dated Apr. 24, 2013, 18 pages.
Notice of Allowance received for U.S. Appl. No. 13/340,046, dated Apr. 16, 2014, 8 pages.
Response to Final Office Action filed on Mar. 20, 2014, for U.S. Appl. No. 13/340,046, dated Nov. 20, 2013, 12 pages.
Response to Non-Final Office Action filed on Aug. 26, 2013, for U.S. Appl. No. 13/340,046, dated Apr. 24, 2013, 11 pages.

(56) References Cited

OTHER PUBLICATIONS

312 Amendment filed for U.S. Appl. No. 14/462,398, dated Nov. 25, 2015, 7 pages.
Non-Final Office Action received for U.S. Appl. No. 14/462,398 dated Mar. 13, 2015, 17 pages.
Notice of Allowance received for U.S. Appl. No. 14/462,398, dated Aug. 31, 2015, 9 pages.
Preliminary Amendment filed for U.S. Appl. No. 14/462,398, dated Aug. 29, 2014, 7 pages.
PTO Response to Rule 312 Amendment for U.S. Appl. No. 14/462,398, dated Jan. 5, 2016, 2 pages.
Response to Non-Final Office Action filed on Aug. 3, 2015, for U.S. Appl. No. 14/462,398, dated Mar. 13, 2015, 20 pages.
Final Office Action received for U.S. Appl. No. 15/002,583, dated Sep. 2, 2016, 8 pages.
Non-Final Office Action received for U.S. Appl. No. 15/002,583, dated May 18, 2016, 19 pages.
Notice of Allowance received for U.S. Appl. No. 15/002,583, dated Dec. 7, 2016, 7 pages.
Preliminary Amendment filed for U.S. Appl. No. 15/002,583, dated Jan. 22, 2016, 8 pages.
Response to Final Office Action filed on Nov. 1, 2016, for U.S. Appl. No. 15/002,583, dated Sep. 2, 2016, 11 pages.
Response to Non-Final Office Action filed on Aug. 17, 2016, for U.S. Appl. No. 15/002,583, dated May 18, 2016, 14 pages.
Advisory Action received for U.S. Appl. No. 15/472,942 dated Mar. 26, 2018, 3 pages.
Final Office Action received for U.S. Appl. No. 15/472,942, dated Feb. 12, 2018, 24 pages.
Non-Final Office Action received for U.S. Appl. No. 15/472,942, dated Aug. 10, 2018, 7 pages.
Non-Final Office Action received for U.S. Appl. No. 15/472,942, dated Oct. 12, 2017, 22 pages.
Notice of Allowance received for U.S. Appl. No. 15/472,942, dated Sep. 21, 2018, 8 pages.
Preliminary Amendment filed for U.S. Appl. No. 15/472,942, dated Apr. 4, 2017, 9 pages.
Response to Final Office Action filed on Feb. 23, 2018, for U.S. Appl. No. 15/472,942, dated Feb. 12, 2018, 20 pages.
Response to Non-Final Office Action filed on Aug. 21, 2018, for U.S. Appl. No. 15/472,942, dated Aug. 10, 2018, 10 pages.
Response to Non-Final Office Action filed on Oct. 31, 2017, for U.S. Appl. No. 15/472,942, dated Oct. 12, 2017, 16 pages.
Response to Office Action filed on Sep. 13, 2018, for Canadian Patent Application No. 2,856,882, dated Jun. 1, 2018, 34 pages.
First Examiner Report received for Australian Patent Application No. 2012362419, dated Mar. 25, 2015, 2 pages.
Response to First Examiner Report filed on Aug. 10, 2015, for Australian Patent Application No. 2012362419, dated Mar. 25, 2015, 17 pages.
Office Action received for Chinese Patent Application No. 201280065110.5, dated Feb. 2, 2016, 29 pages.
Response to Office Action filed on Jun. 17, 2016 for Chinese Patent Application No. 201280065110.5, dated Feb. 2, 2016, 12 pages.
Office Action received for Canada Patent Application No. 2,856,882, dated Jun. 1, 2018, 5 pages.
Office Action Received for Canadian Patent Application No. 2,856,882, dated Apr. 6, 2020, 11 pages.
Office Action received for Canadian Patent Application No. 2,856,882, dated Mar. 28, 2019, 5 pages.
Office Action received for Canadian Patent Application No. 2,856,882, dated Sep. 18, 2015, 4 pages.
Office Action received for Canadian Patent Application No. 2,856,882, dated Sep. 28, 2017, 3 pages.
Office Action received for Korean Patent Application No. 2014-7021217, dated Oct. 12, 2015, 11 pages (Including English Claims).
Response to Office Action filed on Mar. 10, 2016 for Canadian Patent Application No. 2,856,882, dated Sep. 18, 2015, 24 pages.
Response to Office Action filed on Jan. 12, 2016 for Korean Patent Application No. 2014-7021217, dated Oct. 12, 2015, 27 pages (including English Claims).
First Examiner Report received for Australian Patent Application No. 2015275329, mailed on Nov. 18, 2016, 2 pp.
Office Action received for Chinese Patent Application No. 201611101274.5, dated Apr. 10, 2020, 7 pages (3 Pages of Official Copy and 4 pages of English Translation).
Response to First Examiner Report filed on Dec. 8, 2016, for Australian Patent Application No. 2015275329, dated Nov. 18, 2016, 19 pages.
Office Action received for Chinese patent Application No. 201611101274.5, dated Aug. 1, 2019, 10 pages.
Response to Office Action Filed on Dec. 6, 2019, for Chinese Patent Application No. 201611101274.5, dated Aug. 1, 2019, 11 pages (8 pages of Official Copy & 3 pages of English Translation of claims).
Response to Office Action filed on Jun. 5, 2020 for Chinese Patent Application No. 201611101274.5, dated Apr. 10, 2020, 9 pages (6 pages of official copy & 3 pages of English Translation of claims).
First Examination Report received for Australian Patent Application No. 2017202565, dated Mar. 23, 2018, 2 pages.
Response to First Examination Report filed on May 7, 2018 for Australian Patent Application No. 2017202565 dated Mar. 23, 2018, 1 page.
Response to Second Examination Report filed on Nov. 8, 2018 for Australian Patent Application No. 2017202565 dated Jun. 9, 2018, 15 pages.
Response to Third Examination Report filed on Feb. 28, 2019 for Australian Patent Application No. 2017202565 dated Dec. 12, 2018, 16 pages.
Second Examination Report received for Australian Patent Application No. 2017202565, dated Jun. 6, 2018, 3 pages.
Third Examination Report Received for Australian Patent Application No. 2017202565, dated Dec. 12, 2018, 3 pages.
International Preliminary Report on Patentability received for PCT Application No. PCT/US2012/071848, dated Jul. 10, 2014, 6 pages.
International Search Report received for PCT Patent Application No. PCT/US2012/071848, dated Mar. 8, 2013, 2 pages.
Written Opinion received for PCT Patent Application No. PCT/US2012/071848, dated Mar. 8, 2013, 4 pages.
U.S. Appl. No. 13/340,046, filed Dec. 29, 2011, Issued.
U.S. Appl. No. 14/462,398, filed Aug. 18, 2014, Issued.
U.S. Appl. No. 15/002,583, filed Jan. 21, 2016, Issued.
U.S. Appl. No. 15/472,942, filed Mar. 29, 2017, Issued.
U.S. Appl. No. 16/247,851, filed Jan. 15, 2019, Issued.
Communication Pursuant to Article 94(3) EPC received for European Patent Application No. 12862729.6, dated Mar. 10, 2021, 10 pages.

* cited by examiner

SYSTEM AND METHOD FOR TRANSFERRING STATES BETWEEN ELECTRONIC DEVICES

CROSS REFERENCES

This application is a continuation of U.S. patent application Ser. No. 16/247,851 by Zises, entitled "System and Method for Transferring States Between Electronic Devices," filed Jan. 15, 2019; which is a continuation of U.S. patent application Ser. No. 15/472,942 by Zises, entitled "System and Method for Transferring States Between Electronic Devices," filed Mar. 29, 2017, now U.S. Pat. No. 10,200,451; which is a continuation of U.S. patent application Ser. No. 15/002,583 by Zises, entitled "System and Method for Transferring States Between Electronic Devices," filed Jan. 21, 2016, now U.S. Pat. No. 9,621,631; which is a continuation of U.S. patent application Ser. No. 14/462,398 by Zises, entitled "System and Method for Transferring States Between Electronic Devices," filed Aug. 18, 2014, now U.S. Pat. No. 9,246,984; which is a continuation of U.S. patent application Ser. No. 13/340,046 by Zises, entitled "System and Method for Transferring States Between Electronic Devices," filed on Dec. 29, 2011, now U.S. Pat. No. 8,819,798; each of which is incorporated herein by reference in their entirety.

TECHNICAL FIELD

Example embodiments of the present disclosure relate generally to electronic devices, and in particular but not by way of limitation, to a system and method for transferring states between electronic devices.

BACKGROUND

It is common for users to use a variety of electronic devices on a daily basis. For example, at various times of the day, a user may use a desktop, tablet, and/or laptop computer at home, a mobile device while traveling, a computer at work. In some cases, the user may execute the same application or perform the same task on one or more of the devices, while in other cases, the user may perform a portion of a task on one device and complete the remainder of the task on a second device. Currently, options are limited and/or cumbersome for transferring the state or progress of a task or item from one device to another if the user needs to switch devices. For example, if a user is working with a document on a first computing device and needs to switch to a second computing device, the user must save his progress on the document and either transmit the document via a network to the second computing device (e.g., via electronic mail, a file sharing site, a fax) or save the document to storage media for transport to the second computing device. Additionally, such steps typically require the performance of additional set up actions to return the user to a state that duplicates the state of the prior device.

BRIEF DESCRIPTION OF DRAWINGS

Various ones of the appended drawings merely illustrate example embodiments of the present invention and cannot be considered as limiting its scope.

DETAILED DESCRIPTION

The description that follows includes systems, methods, techniques, instruction sequences, and computing machine program products that embody illustrative embodiments of the present invention. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures, and techniques have not been shown in detail.

As used herein, the term "or" may be construed in either an inclusive or exclusive sense. Additionally, although various example embodiments discussed below may refer to a network-based publication system, the embodiments are given merely for clarity in disclosure. Thus, any type of client device operating in a networked environment may employ various embodiments described herein and may be considered as being within a scope of example embodiments. Each of a variety of example embodiments is discussed in detail below.

Example embodiments described herein provide systems and methods for facilitating the transfer of a state of a device from one device to another device. In example embodiments, a request to transfer the state of a device is received. The state of the device may be captured and packaged for transfer. Preferences and availabilities of the channels or methods by which the device state may be transferred are determined. Based on the determined transfer preferences and availabilities, the packaged state of the device may be transferred to another device using a connection determined from the transfer preferences and availabilities. The packaged state may be processed and extracted by the receiving device thereby enabling a user to reproduce the state of the first device on the second device.

By using embodiments of the present invention, a user may efficiently transfer the state of a device to another device, thereby enabling the user to enhance productivity when situations arise that require a user to change devices. Accordingly, one or more of the methodologies discussed herein may obviate a need for cumbersome file and application state transfers and repetitive actions to set up a device to the same state as a previous device.

Figure 1:
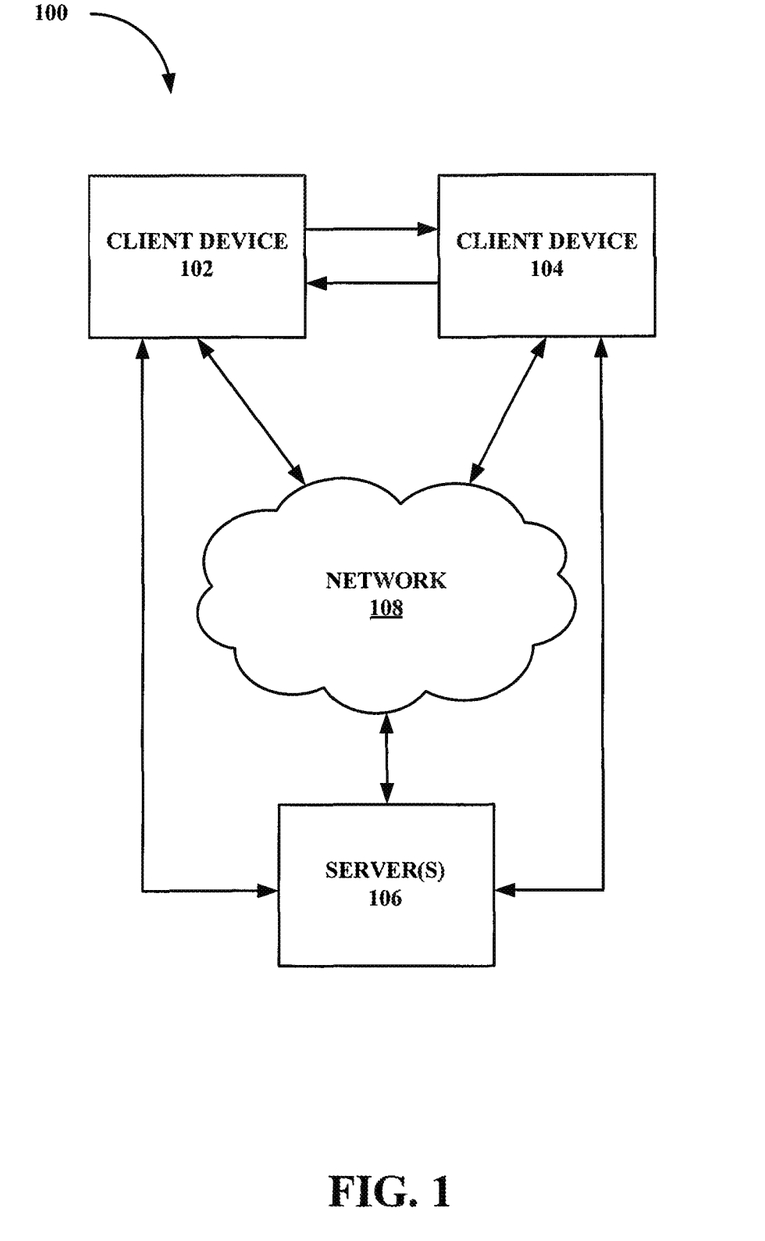
FIG. 1 is a block diagram illustrating a network architecture of a system in which client devices may communicate with each other and a server directly or via a network, according to some embodiments.

With reference to FIG. 1, a network architecture of a system 100 in which client devices may communicate with each other and a server directly or via a network is shown, according to some embodiments. A networked server(s) 106 is coupled via a communication network 106 (e.g., the Internet, Local Area Network (LAN), wireless network, cellular network, or a Wide Area Network (WAN)) to one or more client devices 102 and 104. The client devices 102 and 104 may be connected to each other and the server(s) 106 either directly or via a network using any suitable connections. For example, suitable connections include wireline (such as, for example, Digital Subscriber Line (DSL) or Data Over Cable Service Interface Specification (DOCSIS)), wireless (such as, for example, Wi-Fi or Worldwide Interoperability for Microwave Access (WiMAX)) or optical (such as, for example, Synchronous Optical Network (SONET) or Synchronous Digital Hierarchy (SDH)) connections. Client devices 102 and 104 also may connect to each other or the server(s) 106 using one or more of Bluetooth, Near Field Communication, radio frequency identification (RFID), infrared, Universal Serial Bus (USB), Thunderbolt, or gesture-initiated and/or gesture-driven connections (e.g., Bump). In particular embodiments, one or more connections formed between two devices each may include one or more of an ad hoc network, an intranet, an extranet, a VPN, a LAN, a WLAN, a WAN, a WWAN, a MAN, a portion of the Internet, a portion of the PSTN, a cellular telephone network, or another type of connection, or a combination of two or more such connections. Connections need not necessarily be the same throughout system 100. One or more first connections may differ in one or more respects from one or more second connections. Client devices 102 and 104 may use any of the aforementioned connections to transfer data between each other and/or server(s) 106, including device state information, as will be described in further detail herein.

The networked server(s) 106 may provide storage and connection mechanisms to enable a user to connect two devices and transfer files and/or the state of a device from one device to another. In some embodiments, the user may connect two devices directly using any of the aforementioned protocols discussed above. In other embodiments, the user may indirectly connect two devices via a connection to the server(s) 106 (either directly or through the network 108). In some embodiments, the server(s) 106 may provide a user interface that permits interaction with the server 106 by a user of a device. In some embodiments, the server(s) 106 may form part of a web service that hosts an account for a user to upload, maintain, and download device-related data.

Figure 2:
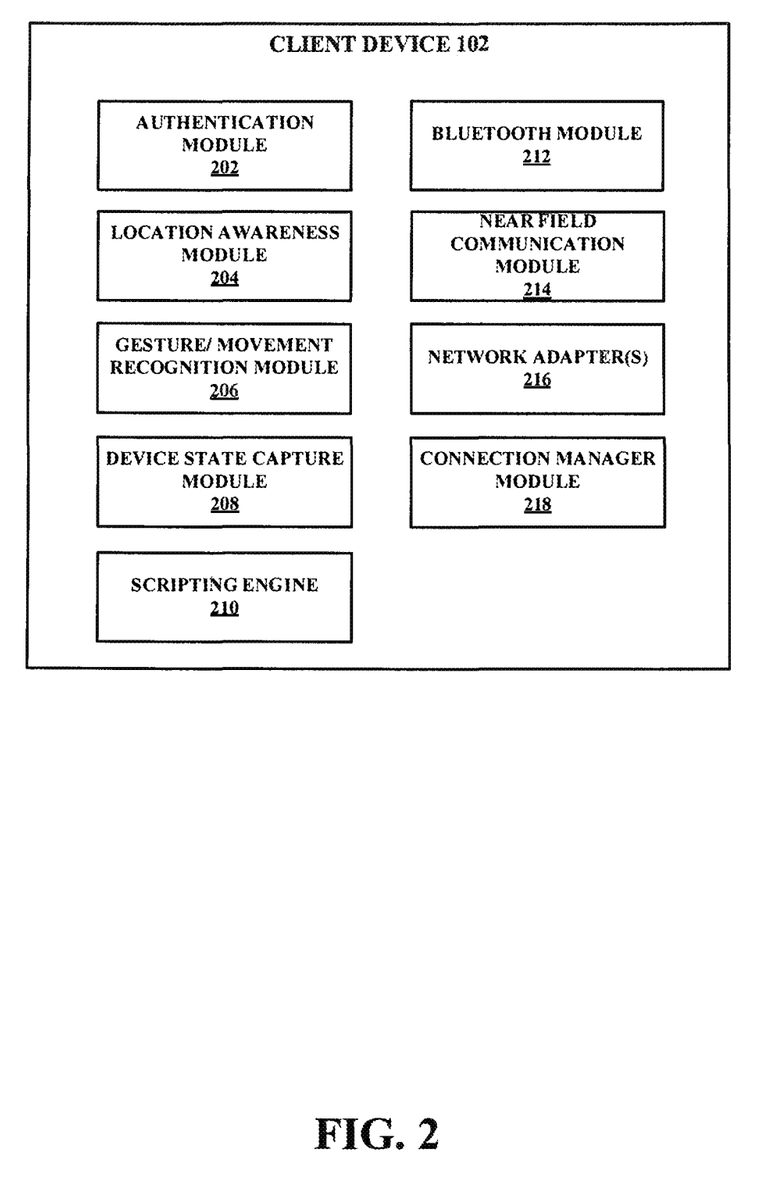
FIG. 2 is a block diagram illustrating a client device configured to capture and transfer a state of the client device to other devices, according to some embodiments.

FIG. 2 is a block diagram illustrating a client device configured to capture and transfer a state of the client device to other devices, according to some embodiments. Referring to FIG. 2, the client device 102 or 104 of FIG. 1 may include multiple modules and components that facilitate the transfer of a device state. An authentication module 202 performs authentication procedures on the device 102. In some embodiments, the authentication module 202 may authenticate a user to enable access the device, while in other embodiments, the authentication module 202 may authenticate a user of the device 102 with respect to a third-party device or service (e.g., a web service, a cloud-based service provider). The authentication module 202 may authenticate a user of a device by requiring that the user enter a username and/or password, an authentication code generated from a token (e.g., hardware token, soft token), biometric identification information (e.g., a fingerprint, voice identification, iris scan, facial recognition), or any combination thereof. In some embodiments, upon authentication, the authentication module 202 may generate or provide a token or certificate that may be passed to other devices and services as an indicator that the user of the device is authorized. In some embodiments, the authentication module 202 may pre-authenticate or register the device 102 with a third-party provider of services for enabling the transfer of a device state to avoid requiring the user to authenticate the device 102 before transferring the state of the device 102 to another device.

A location awareness module 204 ascertains the location of the device 102. The location of the device 102 may be a set of coordinates determined by leveraging functionality commonly found in client devices, such as a GPS module. In other embodiments, the location awareness module 204 may determine a location based on one or more other factors, such as IP address, the Wi-Fi network the device 102 is connected to, triangulation, or by the user specifying the location to the device 102. In some embodiments, the device 102 may be authenticated by the authentication module 202 in part based on a detection of a recognized and/or previously authenticated location of the device 102. In some embodiments, location-based authentication also may require an identification of the device itself, such as by using a Media Access Control (MAC) address of the device. For example, if a client device 102 enters the range of previously recognized Wi-Fi network and connects to the Wi-Fi network, the location awareness module 204 may recognize the location of the client device 102. If the client device 102 was previously authenticated on the Wi-Fi network, in some embodiments, the device 102 may be authenticated based on the previous authentication.

A gesture recognition module 206 may recognize gestures performed on or by the client device 102. In some embodiments, recognized gestures may prompt the device 102 to initiate a capture and transfer of the state of the device. For example, a user interface presented on the device 102 may include a selectable user interface element (e.g., a button, an icon) that, when selected, causes the device 102 to capture its current state for transfer to another device. In other embodiments, a recognized gesture performed on a touch-enabled surface of the device 102 may trigger the device state transfer process. In yet another embodiment, a recognized movement of the device may trigger the device state transfer process. For example, if a user moves the device 102 into close proximity to another device, the act of moving the device 102 may be sensed by the device 102 (e.g., by an accelerometer in the device 102) and may be interpreted as a triggering of the device state transfer process.

A device state capture module 208 may capture and package the state of the device 102 upon receiving an indication that the device state is to be transferred. In some embodiments, the device state capture module 208 may record every user application executing on the device 102. A script containing execution paths for the recorded applications may be generated. The script may allow for a receiving device to quickly execute the recorded applications upon receiving the device state transfer. In some embodiments, the state of each executing application also is recorded and/or saved such that execution of the applications on another device causes the applications to be executed at their respective recorded states. The state may include, among other things, a progress within the application (e.g., a level or stage of a game, a stage in a workflow, a location of navigation within a document, such as a web page) and one or more documents being operated on by the application.

In some embodiments, the device state capture module 208 may employ one or more scripts to capture information within applications or pages that may not otherwise be transferred. For example, data inputted into forms or fields of an application or a document being edited in an application may not be captured by merely recording the execution of the application. In these situations, one or more scripts (e.g., Javascript) may capture and save the inputted form or field data and may map the association between the inputted data and the field in which the data was entered to ensure correct population of the form at the receiving device.

In some embodiments, the device state capture module 208 may package the captured applications, application states, and inputted data in a single file. In some embodiments, the single file may include scripts, files, and data captured from the scripts. In some embodiments, the single file may be a zipped or compressed file. To minimize the size of the file and bandwidth needed to transmit the file, hyperlinks or other shortcuts (e.g., pointers, delta files, execution paths) may be packaged instead of an entire application or application state. The file may be executed or unpacked by the receiving device to launch the applications previously executing on the transferring device, open the documents previously being operated on by the applications, and populate the forms with inputted data. In some embodiments, logic contained in the file may aid in correctly populating forms (e.g., web-based forms). In some embodiments, the logic may examine the packaged data relative to the available fields of a form to determine which data should populate which field. In other embodiments, the logic may examine the stored mapping or association between the data and the form fields to correctly populate the form. In some embodiments, an objective of the transfer is to allow current applications to run immediately on the receiving device while more data intensive apps or data are loaded in the background. For example, if a user is working on a Microsoft Powerpoint® file in the background and is currently accessing a web page via the Internet using a browser application, prioritizing the transfer of the data related to the Internet browser application over the Powerpoint data will allow the transfer to appear seamless on the receiving device. Prioritization, in some embodiments, may entail transferring the Internet browser application data first, followed by the Powerpoint data second. In other embodiments, prioritization may entail transferring the Internet browser application data at a faster transfer rate than the Powerpoint data. In yet another embodiment, enough data of the Internet browser application data as is needed to launch the browser application on the receiving device may be transferred before the Powerpoint data is transferred. This approach may enable the application running in the foreground (e.g., the Internet browser application) to be launched first.

A scripting engine 210 may generate scripts as needed to capture data from documents, pages, and forms, among other things. The scripting engine 210 may determine the type of document being processed. In some embodiments, this examination may entail examining the metadata or source of the document to identify and extract the structure and composition of the fields. For example, the scripting engine 210 may parse the source of a web page and identify any fields present as denoted by the appropriate HTML tags (e.g., <form> tag) and input types (e.g., <password> type, <radio> type, <checkbox> type). The scripting engine may generate one or more scripts that are capable of capturing input data entered into the various types of input elements based on the parsing.

A Bluetooth module 212 may provide Bluetooth functionality for the client device 102. The Bluetooth module 212 may permit the client device 102 to transfer device states to another Bluetooth-enabled device by creating a Personal Area Network (PAN) between the client device 102 and the receiving device. In the event that the client device 102 and the receiving device are not paired, the Bluetooth module 212 may first initiate a pairing between the client device 102 and a receiving device.

A near field communication (NFC) module 214 may permit the client device 102 to transfer device states to a receiving device via radio communications over a short distance, provided that the receiving device also supports NFC communication.

The client device 102 may include one or more network adapters and communication ports 216 to facilitate transfer of devices states. For example, the client device 102 may include a Wi-Fi adapter (e.g., 802.11 standard) to enable Wi-Fi communications. The client device 102 also may include one or more of a standard USB port, a mini-USB port, a micro-USB port, a wireless USB adapter, non-USB wireless adapters, and non-USB wired ports and adapters. Any and all of these adapters and ports may be used to transfer state information of the client device 102 to a receiving device.

A connection manager module 218 may determine the appropriate connection to use to transfer a device state from the client device 102 to a receiving device. The connection manager module 218 may store a prioritized list of connection types. In some embodiments, the list may be user-defined. The prioritized list of connection types may specify an order of preferred connections. For example, the client device 102 may preferably use Wi-Fi to transfer a device state if Wi-Fi is an available connection type. If Wi-Fi is not enabled, the list may specify that NFC is the next preferred connection type, followed by Bluetooth, and as a last resort by a cellular connection to a cloud-based storage provider. In some embodiments, the prioritized list of connection types may be dynamically determined based on available connections, the amount of data to be transferred to the receiving device, the bandwidth of the available connections, and the amount of time required to transfer the device state via each available connection. The connection manager module 218 may open and initiate the selected connection channel and may oversee the transfer of the device state to the receiving device.

Figure 3:
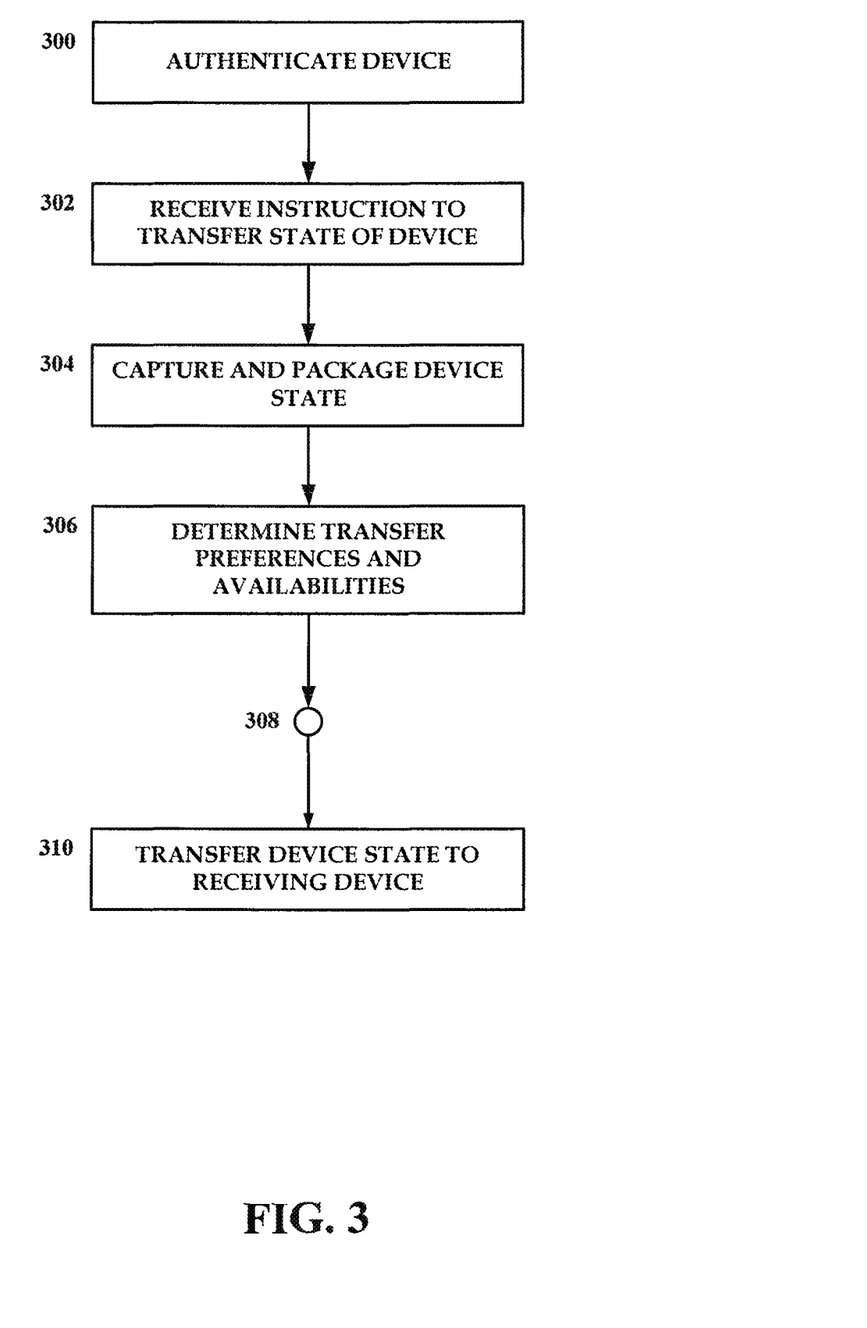
FIG. 3 is a flow diagram of an example method for transferring the state of a device from one device to another device, according to some embodiments.

FIG. 3 is a flow diagram of an example method for transferring the state of a device from one device to another device, according to some embodiments. In block 300, a user of a client device may be authenticated. In some embodiments, the authentication may be performed by the client device, such as, for example, by requiring the user to enter credentials (e.g., username and password, token code, biometric data). In some embodiments, further authentication may be performed by a third-party service provider, such as a cloud-based storage provider that the client device 102 intends to use to transfer a device state to a receiving device. In some embodiments, authentication may be stored and pre-approved to eliminate the need for the user to provide authentication each time the user wishes to transfer a device state.

In block 302, the device or third-party facilitator (e.g., cloud-based service provider) of a device state transfer may receive an instruction to transfer the state of the device. The instruction may be received in a variety of ways, including by an input selection performed on an input element of a user interface of the client device, by a recognized gesture performed by the device itself or performed on a touch-enabled interface of the device, by voice command or recognition, or by other biometric identification or user-performed action. The instruction may comprise an input to transfer the device state or may include additional instructions specifying such things as a subset of the device state (e.g., transfer only the state of one of three executing applications) to transfer or a designation of one or more preferred communication channels to use (e.g., use only Wi-Fi or Bluetooth).

In block 304, the device state capture module 208 of FIG. 2 may capture the device state or subset of device state and package the captured state for transfer to a receiving device. In some embodiments, capturing the device state may comprise recording and/or logging the applications executing on the device, saving a copy of documents and files in use (e.g., opened, edited, manipulated, operated on) on the device, recording and/or logging one or more web pages opened, executing one or more scripts to extract data (e.g., form-based data, data entered into data fields, metadata) from documents or pages that would otherwise be lost.

In some embodiments, capturing the device state further may include identifying and gathering one or more files that, while not open on the device, have been designated by the user as files to be transferred. For example, the user may wish to transfer one or more songs, video files, movies, contacts, bookmarks, preferences, or coupons to a receiving device. One example where the transfer of such documents may be useful is in setting up a new device to replicate the settings of the old device. For example, when a user buys a new mobile device, the user may wish to import settings, contacts, and files (e.g., songs, movies, documents) from the old mobile device to the new mobile device. The device state capture module 208 may gather these files and settings and package them with or instead of the device state.

In some embodiments, the device state capture module 208 may package the device state and/or selected files and settings in a single file. In some embodiments, the file may be a zipped or compressed file that may be unpacked by a receiving device to yield one or more files or scripts that reproduce the state of a device on a receiving device. In some embodiments, hyperlinks and execution paths may be recorded and used in place of packaging an actual application for transfer. In the event a receiving device does not have an application installed, the package may specify a location from which the application may be downloaded and installed on the receiving device. In other embodiments, an error message may be generated and provided to a user indicating that the receiving device cannot fully reproduce the state of a transferring device.

In block 306, the device may determine transfer preferences and connection type availabilities. The connection manager module 218 of FIG. 2 may select a connection type to use to transfer the device state package from the transferring device to the receiving device. Selection of the connection type may depend on connection type availabilities and compatibilities (e.g., whether both devices support a particular connection type) as well as the size of the device state package being transferred, the amount of time estimated to transfer the device state package, the available bandwidth of each connection type, and user preferences for particular connection types, among other things. Possible direct transfer connection types include Wi-Fi, Bluetooth, NFC, cellular connections, or any other wireless connection capable of being formed between two devices and wired connections such as USB, Thunderbolt, Ethernet, non-USB wired connections (e.g., FireWire), and the like. Possible indirect transfer connection types may utilize cellular or Wi-Fi connections to transfer the device state package to a remote network service provider (e.g., cloud-based service provider) that routes the device state package via a network to a receiving device. In some embodiments, routing a transfer of a device state package through a cloud-based service provider may be desirable in that a copy of the device state package that is being transferred is stored for future reference or access.

Figure 4:
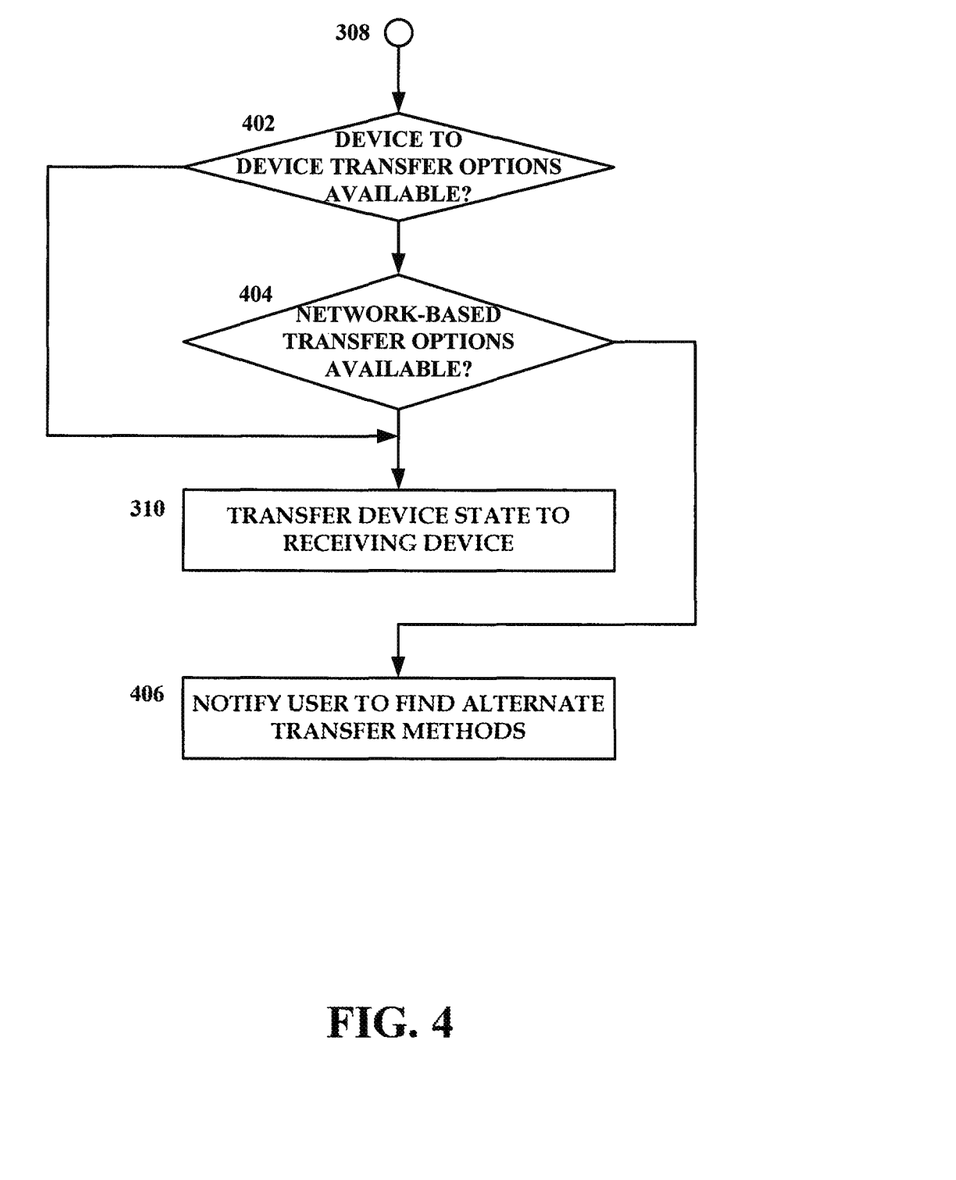
FIG. 4 is a flow diagram of an example method for transferring the state of a device from one device to another device, according to some embodiments.

The determination of transfer preferences is further explained in detail at block 308, which will be expanded upon in FIG. 4.

At block 410, the device state is transferred to the receiving device, where it may be processed. The device state of the transferring device may be reproduced on the receiving device, thereby providing an efficient way to seamlessly transition from using one device to using another device. Productivity may be increased using the systems and methods described herein as a user can quickly and easily transfer the user's work from one device to another.

FIG. 4 is a flow diagram of an example method for transferring the state of a device from one device to another device, according to some embodiments. At decision block 402, which follows block 308 of FIG. 3, the connection manager module 218 may determine the direct device-to-device transfer options that are available. The connection manager module 218 may determine whether the two devices (transferring and receiving) support the same connection types. For example, it may be determined that both devices support NFC. If direct device-to-device connection options are available, the connection manager module 218 may determine and select a connection type to use for the device state transfer using the criteria discussed herein. In some embodiments, the connection manager module 218 may employ an algorithm that assigns weights to the various factors that influence the selection of a connection type as discussed herein. Once a connection type has been specified, the example method may proceed to block 310 of FIG. 3 where the device state may be transferred to the receiving device.

If direct connections between the two devices are unavailable or untenable, the example method proceeds to decision block 404, where it is determined if network-based transfer options are available. Network-based transfer options may include Wi-Fi, Bluetooth, and cellular (e.g., 3G, 4G) connections. In some embodiments, two devices may connect directly via a network, such as by using Wi-Fi to transmit a device state. In other embodiments, the transferring device may use a network connection (e.g., Wi-Fi) to transmit the device state to a remote network device (e.g., a cloud-based service provider) from which a receiving device may download the device state. As discussed herein, the connection manager 218 may select a network-based connection based on the factors previously discussed. Once a connection type has been specified, the example method may proceed to block 310 of FIG. 3 where the device state may be transferred to the receiving device using the selected connection.

If network-based connections are also unavailable, at block 406, a notification may be provided to the user to find alternate transfer connections. At this point, the user may choose to employ a wired connection (e.g., via USB cable) to transfer the device state or may opt to wait until a suitable connection is established between the devices.

Modules, Components, and Logic

Additionally, certain embodiments described herein may be implemented as logic or a number of modules, engines, components, or mechanisms. A module, engine, logic, component, or mechanism (collectively referred to as a "module") may be a tangible unit capable of performing certain operations and configured or arranged in a certain manner. In certain example embodiments, one or more computer systems (e.g., a standalone, client, or server computer system) or one or more components of a computer system (e.g., a processor or a group of processors) may be configured by software (e.g., an application or application portion) or firmware (note that software and firmware can generally be used interchangeably herein as is known by a skilled artisan) as a module that operates to perform certain operations described herein.

In various embodiments, a module may be implemented mechanically or electronically. For example, a module may comprise dedicated circuitry or logic that is permanently configured (e.g., within a special-purpose processor, application specific integrated circuit (ASIC), or array) to perform certain operations. A module may also comprise programmable logic or circuitry (e.g., as encompassed within a general-purpose processor or other programmable processor) that is temporarily configured by software or firmware to perform certain operations as described herein. It will be appreciated that a decision to implement a module mechanically, in dedicated and permanently configured circuitry, or in temporarily configured circuitry (e.g., configured by software) may be driven by, for example, cost, time, energy-usage, and package size considerations.

Accordingly, the term "module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which modules or components are temporarily configured (e.g., programmed), each of the modules or components need not be configured or instantiated at any one instance in time. For example, where the modules or components comprise a general-purpose processor configured using software, the general-purpose processor may be configured as respective different modules at different times. Software may accordingly configure the processor to constitute a particular module at one instance of time and to constitute a different module at a different instance of time. The processor may be temporary configured or permanently configured to perform relevant operations. Whether temporarily configured or permanently configured, such processors may constitute processor-implemented modules that operate to perform one or more operations or functions.

Modules can provide information to, and receive information from, other modules. Accordingly, the described modules may be regarded as being communicatively coupled. Where multiples of such modules exist contemporaneously, communications may be achieved through signal transmission (e.g., over appropriate circuits and buses) that connect the modules. In embodiments in which multiple modules are configured or instantiated at different times, communications between such modules may be achieved, for example, through the storage and retrieval of information in memory structures to which the multiple modules have access. For example, one module may perform an operation and store the output of that operation in a memory device to which it is communicatively coupled. A further module may then, at a later time, access the memory device to retrieve and process the stored output. Modules may also initiate communications with input or output devices and can operate on a resource (e.g., a collection of information).

Example Machine Architecture and Machine-Readable Medium

Figure 5:
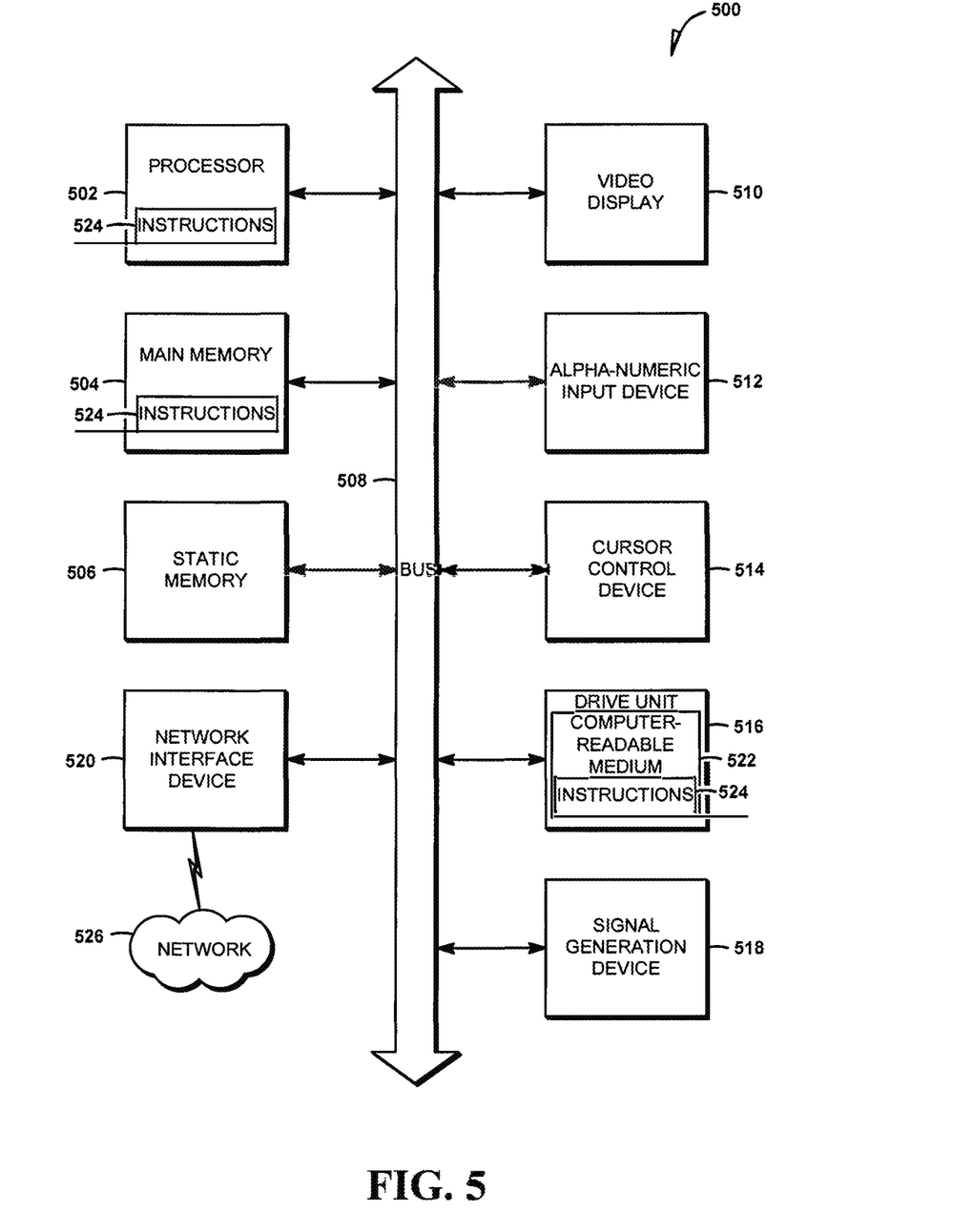
FIG. 5 is a simplified block diagram of a machine in an example form of a computing system within which a set of instructions for causing the machine to perform any one or more of the methodologies discussed herein may be executed.

With reference to FIG. 5, an example embodiment extends to a machine in the example form of a computer system 500 within which instructions for causing the machine to perform any one or more of the methodologies discussed herein may be executed. In alternative example embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, a switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 500 may include a processor 502 (e.g., a central processing unit (CPU), a graphics processing unit (GPU) or both), a main memory 504 and a static memory 506, which communicate with each other via a bus 508. The computer system 500 may further include a video display unit 510 (e.g., a liquid crystal display (LCD) or a cathode ray tube (CRT)). In example embodiments, the computer system 500 also includes one or more of an alpha-numeric input device 512 (e.g., a keyboard), a user interface (UI) navigation device or cursor control device 514 (e.g., a mouse), a disk drive unit 516, a signal generation device 518 (e.g., a speaker), and a network interface device 520.

Machine-Readable Storage Medium

The disk drive unit 516 includes a machine-readable storage medium 922 on which is stored one or more sets of instructions 524 and data structures (e.g., software instructions) embodying or used by any one or more of the methodologies or functions described herein. The instructions 524 may also reside, completely or at least partially, within the main memory 504 or within the processor 502 during execution thereof by the computer system 500, with the main memory 504 and the processor 502 also constituting machine-readable media.

While the machine-readable storage medium 522 is shown in an example embodiment to be a single medium, the term "machine-readable storage medium" may include a single medium or multiple media (e.g., a centralized or distributed database, or associated caches and servers) that store the one or more instructions. The term "machine-readable medium" shall also be taken to include any tangible medium that is capable of storing, encoding, or carrying instructions for execution by the machine and that cause the machine to perform any one or more of the methodologies of embodiments of the present invention, or that is capable of storing, encoding, or carrying data structures used by or associated with such instructions. The term "machine-readable storage medium" shall accordingly be taken to include, but not be limited to, solid-state memories and optical and magnetic media. Specific examples of machine-readable storage media include non-volatile memory, including by way of example semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and CD-ROM and DVD-ROM disks.

Transmission Medium

The instructions 524 may further be transmitted or received over a communications network 526 using a transmission medium via the network interface device 520 and utilizing any one of a number of well-known transfer protocols (e.g., HTTP). Examples of communication networks include a local area network (LAN), a wide area network (WAN), the Internet, mobile telephone networks, POTS networks, and wireless data networks (e.g., WiFi and WiMax networks). The term "transmission medium" shall be taken to include any intangible medium that is capable of storing, encoding, or carrying instructions for execution by the machine, and includes digital or analog communications signals or other intangible medium to facilitate communication of such software.

Although an overview of the inventive subject matter has been described with reference to specific example embodiments, various modifications and changes may be made to these embodiments without departing from the broader spirit and scope of embodiments of the present invention. Such embodiments of the inventive subject matter may be referred to herein, individually or collectively, by the term "invention" merely for convenience and without intending to voluntarily limit the scope of this application to any single invention or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present invention. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present invention as represented by the appended claims. The specification and drawings are, accordingly, to be regarded in an illustrative rather than a restrictive sense.

What is claimed is:

1. A computer-implemented method comprising:
   receiving, by a processor, an instruction to transfer a state of a first device to a second device;
   capturing, by the processor, a set of device settings associated with the first device based at least in part on the instruction;
   packaging, by the processor, the captured set of device settings into information relating to the state of the first device in a file that instructs the second device to use the file to reproduce the state of the first device on the second device; and
   transferring the file containing the information relating to the state of the first device to the second device.

2. The method of claim 1, wherein transferring the file comprises:
   transferring the file that instructs the second device to replicate the captured set of device settings on the second device.

3. The method of claim 1, further comprising:
   receiving, by the processor, user credentials, wherein transferring the file containing the information relating to the state of the first device is based at least in part on receiving the user credentials.

4. The method of claim 3, wherein receiving the user credentials comprises:
   prompting a user to input the user credentials; and
   receiving, by the processor, at least one of a user name, a password, a token code, biometric data, or a user identifier based at least in part on prompting the user to input the user credentials.

5. The method of claim 1, wherein capturing the set of device settings comprises:
   capturing the set of device settings that comprise at least one of a user-designated setting, a user preference, or both, associated with the first device.

6. The method of claim 1, wherein capturing the set of device settings comprises:
   capturing the set of device settings that comprise at least one of a bookmark, a contact, or both.

7. The method of claim 1, further comprising:
   receiving an error message from the second device indicating the second device is unable to reproduce the state of the first device.

8. A system comprising:
   one or more processors; and
   a non-transitory machine-readable storage medium coupled to the one or more processors, the non-transitory machine-readable storage medium including instructions that, when executed by the one or more processors, cause the system to perform operations comprising:
   receiving an instruction to transfer a state of a first device to a second device;
   capturing a set of device settings associated with the first device based at least in part on the instruction;
   packaging the captured set of device settings into information relating to the state of the first device in a file that instructs the second device to use the file to reproduce the state of the first device on the second device; and
   transferring the file containing the information relating to the state of the first device to the second device.

9. The system of claim 8, wherein the instructions to transfer the file, when executed by the one or more processors, cause the system to perform operations comprising:
   transferring the file that instructs the second device to replicate the captured set of device settings on the second device.

10. The system of claim 8, wherein the instructions, when executed by the one or more processors, cause the system to perform operations comprising:
    receiving user credentials, wherein transferring the file containing the information relating to the state of the first device is based at least in part on receiving the user credentials.

11. The system of claim 10, wherein the instructions to receive the user credentials, when executed by the one or more processors, cause the system to perform operations comprising:
    prompting a user to input the user credentials; and receiving at least one of a user name, a password, a token code, biometric data, or a user identifier based at least in part on prompting the user to input the user credentials.

12. The system of claim 8, wherein the instructions to capture the set of device settings, when executed by the one or more processors, cause the system to perform operations comprising:

capturing the set of device settings that comprise at least one of a user-designated setting, a of user preference, or both, associated with the first device.

13. The system of claim 8, wherein the instructions to capture the set of device settings, when executed by the one or more processors, cause the system to perform operations comprising:

capturing the set of device settings that comprise at least one of a bookmark, a contact, or both.

14. The system of claim 8, wherein the instructions, when executed by the one or more processors, cause the system to perform operations comprising:

receiving an error message from the second device indicating the second device is unable to reproduce the state of the first device.

15. A non-transitory machine-readable storage medium comprising processor executable instructions that, when executed by a processor of a machine, cause the machine to perform operations comprising:

receiving an instruction to transfer a state of a first device to a second device;

capturing a set of device settings associated with the first device based at least in part on the instruction;

packaging the captured set of device settings into information relating to the state of the first device in a file that instructs the second device to use the file to reproduce the state of the first device on the second device; and transferring the file containing the information relating to the state of the first device to the second device.

16. The non-transitory machine-readable storage medium of claim 15, wherein the instructions to transfer the file, when executed, cause the machine to perform operations comprising:

transferring the file that instructs the second device to replicate the captured set of device settings on the second device.

17. The non-transitory machine-readable storage medium of claim 15, wherein the instructions, when executed, cause the machine to perform operations comprising:

receiving user credentials, wherein transferring the file containing the information relating to the state of the first device is based at least in part on receiving the user credentials.

18. The non-transitory machine-readable storage medium of claim 17, wherein the instructions to receive the user credentials, when executed, cause the machine to perform operations comprising:

prompting a user to input the user credentials; and receiving at least one of a user name, a password, a token code, biometric data, or a user identifier based at least in part on prompting the user to input the user credentials.

19. The non-transitory machine-readable storage medium of claim 15, wherein the instructions to capture the set of device settings, when executed, cause the machine to perform operations comprising:

capturing the set of device settings that comprise at least one of a user-designated setting, a user preference, or both, associated with the first device.

20. The non-transitory machine-readable storage medium of claim 15, wherein the instructions, when executed, cause the machine to perform operations comprising:

receiving an error message from the second device indicating the second device is unable to reproduce the state of the first device.

* * * * *